May 30, 1967  R. E. WOOD  3,322,022
PRISMATIC DISTANCE MEASURING INSTRUMENT HAVING
A PLURALITY OF DISCRETE PRISMS
Filed Feb. 28, 1966  2 Sheets-Sheet 1

INVENTOR.
RUSSELL E. WOOD
BY Jacobi & Davidson
ATTORNEYS

3,322,022
PRISMATIC DISTANCE MEASURING INSTRUMENT HAVING A PLURALITY OF DISCRETE PRISMS
Russell E. Wood, 9113(C) Derbyshire Road, Richmond, Va. 23229
Filed Feb. 28, 1966, Ser. No. 530,461
2 Claims. (Cl. 88—2.3)

This application is a continuation-in-part of my prior copending applications Ser. Nos. 399,920, filed Sept. 28, 1964, and 279,808, filed May 13, 1963, each as a continuation-in-part of my earlier application Ser. No. 250,172, filed Jan. 8, 1963, and now abandoned.

This invention relates to a device for measuring the distance between an observer and a distant object, and more particularly it relates to a prismatic instrument which utilizes the difference between an image as seen directly by the observer and the refracted image as seen by the observer through a prism to measure the distance from the observer to a distant object.

There are many instances when an observer who is located some distance away from an object or landmark of known dimension desires to know the distance between himself and the object. The present invention provides an instrument which enables the observer to calculate his distance from the object, so long as a dimension of the object perpendicular to the observer's line of sight is known. As such, the present invention finds particular utility in military applications, although it is in no way limited thereto. For example, possible military uses of an instrument of the type set forth in the present invention include position finding, navigation, station keeping, weaponry, emergency distance finding when other equipment such as radar is not available, and so on. However, in addition to the military applications of the present invention, there are many other applications for which the instrument can be used, as, for example, by sportsmen. In this regard, the invention finds particular utility for use by small craft operators, golfers, scouts, woodmen, hunters, and the like.

There have, of course, been various prior art devices and techniques, such as stadiameters, and the like, for accomplishing distance measurement or range finding such as that accomplished by the present invention, but for the most part, these prior art devices have not been entirely satisfactory. For example, most such prior art devices included various precision interfitting parts which had to be carefully adjusted relative to one another to accomplish the desired distance measurement. Naturally, devices of this type were extremely expensive to manufacture, and were somewhat cumbersome for an observer to carry about with him or on his person. Additionally, such prior art devices were subject to deleterious effects of weather, required lengthy and complicated manipulations to obtain the desired distance measurements, and were generally fragile or delicate devices which were not readily adaptable for use in the field.

With the foregoing in mind, it is, therefore, an object of the present invention to overcome the shortcomings and deficiencies associated with prior art devices for measuring distance, and to provide in their stead a new and improved distance measuring instrument.

Another object of the present invention is to provide a distance measuring instrument or device which is rugged and reliable, yet can be inexpensively manufactured with a high degree of accuracy.

Another object of the present invention is to provide a distance measuring instrument which can be carried on the person and which can be quickly and easily utilized to obtain a distance measurement.

Further objects of the present invention include the provision of an instrument which: (a) is fabricated of a single, molded piece of optically transparent material; (b) can be accurately and economically manufactured by existing mass-production techniques; (c) is watertight and is impervious to the adverse effects of weather; (d) provides accurate measurements, yet needs no mechanical action or precision settings; (e) is light-weight and pocket size and can be readily carried by an observer; (f) needs only a one-handed operation to provide the desired distance measurement; and (g) can be used at night time without the need for additional light.

A further object of the present invention is to provide an instrument which can utilize prismatic refraction as compared to direct observation for establishing the distance from an observer to an object, or which can use a selected multiplier of a target dimension and can thus combine triangulation with prismatic refraction and direct observation to obtain the desired distance measurement.

Other objects, advantages and salient features of the present invention will become apparent from the following detailed description, which, taken in conjunction with the annexed drawings, discloses a preferred embodiment hereof.

The foregoing objects are attained by providing a member having a plurality of individual prisms disposed about the periphery thereof, each of such prisms having a different refraction ratio correlating the distance between an object with a known dimension thereof. As such, each individual prism thus has a particular multiplication factor. To utilize the device, an observer sights a distant object having a known dimension perpendicular to his line of sight, e.g. having a known width or a known height. Assuming that the object has a known height, the observer then places a prism perpendicularly to his line of sight between his eye and the object, so that one edge of the prism will visually intersect the object. In this manner the observer will view the image of the object directly, and he will also view the image of the object as refracted through the prism. Ideally, the top of the image as seen refracted through the prism should coincide with the bottom of the image as seen directly, and if this does not occur with the prism which the observer is using, the observer then changes to another prism, and continues to change until he finds the prism which properly coincides the direct and refracted images in this manner or most closely approximates doing so. Then, by utilizing the multiplication factor of that particular prism, and by multiplying the same by the known height of the object, the observer calculates the distance between himself and the object being sighted.

As an example of the manner in which the device of the present invention can be utilized, let it be assumed that the observer is on a ship and he sights a distant lighthouse of known height, for example, 150 feet. If the observer desired to find his distance from the lighthouse, he would interpose the instrument of the present invention in his line of sight to the lighthouse, would continue to make test sightings through the various prisms until he found one where the top of the refracted image through the prism coincided with the bottom of the image as seen directly. If the prism which accomplished this coincidence had a multiplier number of 40, the observer would then know that his distance from the lighthouse was equal to 40 x 150 feet or 6,000 feet.

As another example, let it be assumed that the device of the present invention is being utilized by a golfer who knows that a flag stick on a green is 2 yards in height. If the golfer can see the flag stick and desires to know his distance therefrom, he can utilize the instrument of the present invention in the manner broadly described hereinabove until he finds a particular prism where the top of the flag stick is as refracted therethrough corresponds with the bottom of the flag stick as seen directly. If this particular prism, for example, has a multiplier number of 60, then the observer knows that he is 60 x 2 yards or 120 yards from the flag stick.

Referring now to the drawings.

Figure 1:
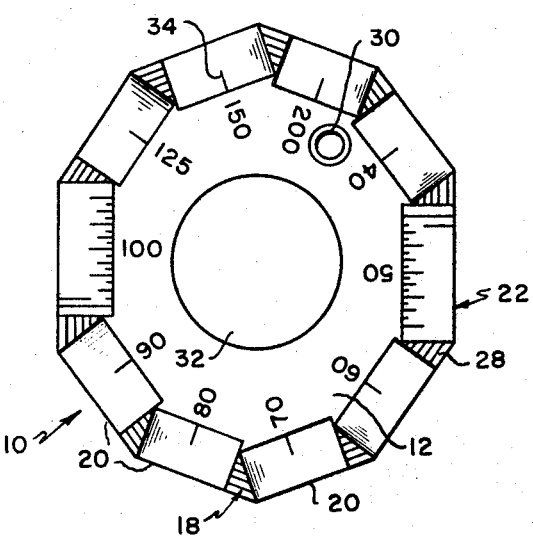
FIGURE 1 is a top plan view of an instrument in accordance with the principles of the present invention.

Referring now to the drawings, the device or instrument itself is generally designated 10 and is formed as an integral member fabricated of an optically transparent material. From the standpoint of ease of manufacture, it is preferred that the member be formed of a synthetic resinous material having appropriate optical clarity, so that the same may be formed by injection molding or other suitable mass production techniques which can be employed with plastics.

The member itself can be desingated 12 and is formed with a front surface 14 and a rear surface 16. In any event, the surfaces 14 and 16 are congruent, but it is preferred that each such surface is a generally planar surface, and that the surfaces 14 and 16 are disposed in parallel disposition to one another. The surfaces 14 and 16 are polygonal in shape and hence are bounded by a perimeter generally designated 18, formed by a plurality of interconnected straight edge portions 20. The edge portions 20 extend perpendicularly between the surface 14 and 16, when the same are in parallel planar relationship.

Figure 2:
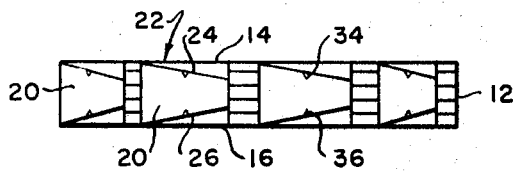
FIGURE 2 is a side elevational view thereof.
Figure 3:
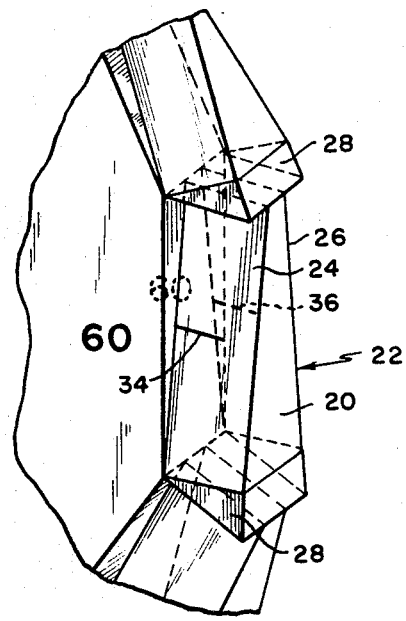
FIGURE 3 is a fragmentary perspective view of one edge portion of the instrument of the present invention.
Figure 8:
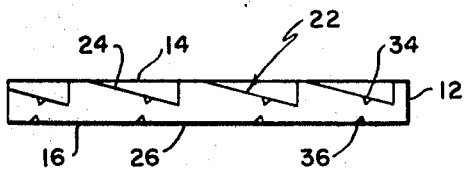
FIGURE 8 is a side elevational view of a modified instrument.

The central portion of the disc 12 serves as a prism mounting member upon which the plurality optical prisms generally designated 22 are mounted in succeeding arrangement. The nature of these optical prisms 22 can best be understood by reference to FIGURES 2 and 3, wherein it can be seen that each prism is provided with a pair of refractive faces 24, 26, such faces being disposed angularly with respect to one another. The edge surface 20 forming the periphery of the disc 12 extends between these refractive faces, and is perpendicular to both such faces. The refractive faces 24 and 26 for each prism are angularly disposed out of the plane of the forward and rearward surfaces 14 and 16. As shown in FIGURE 2, the faces 24 and 26 converge toward one another and thus form a prism having an effective width somewhat smaller than the thickness of the disc 12. However, as shown in FIGURE 8, the instrument can be manufactured with refractive face 26 coplanar with the rearward surface 16. In either event, the refractive prism faces are within the boundaries of the surfaces of the disc 12.

Although the prisms 22 are located in succeeding arrangement about the periphery of the disc 12, and are integrally fixed thereto and formed therewith, each succeeding prism is nevertheless separate from its adjacent prisms by means of small triangular extensions 28 projecting outwardly from the center portion of the disc 12. These triangular portions 28 can, if desired, be shaded or lineated to thereby clearly contrast the same from the refractive faces of the prisms 22.

Each individual prism 22 has a selected refraction ratio which is determined by the placement and disposition of the refractive faces 24 and 26, as well as by the index of refraction for the material from which the prism is fabricated. The refraction ratio for any particular prism correlates the distance to an object with a known dimension of the object. For each particular prism, a multiplier number, corresponding to the refraction ratio of the prism, is disposed on one or the other surfaces of the disc 12. Thus, as can be seen in FIGURE 1, the multiplier numbers can be from "40" to "200," and the prism associated with each of these indicating numbers will have its refraction ratio so correlated as to provide the desired distance information in the manner to be described hereinafter.

A hole or aperture 30 is provided in the disc 12 to permit a lanyard to be threaded therethrough, and to thereby enable the device 10 to be body-carried by the lanyard. Also, the aperture 30 can serve to provide an indicating means to enable the device 10 to be utilized at night time. Since the aperture 30 is, as shown in FIGURE 1, interposed between the highest number prism and the lowest number prism, the user can rely upon this hole as a starting point and can then successively count the number of prisms until he reaches the one which he is using. In this manner, he will know the multiplier number associated with the prism he is using, even if it is too dark to read the same.

The central portion 32 of the device 10 can be utilized to carry instructions for operation of the instrument, or alternatively, it can serve to mount a compass so that the instrument can be used for direction findings as well as for range findings.

A guide line 34 extends across the midpoint of the refractive face 24 of each prism 22, such guide line extending from the inner edge thereof toward the outer edge surface 20, preferably in a perpendicular manner. Similarly, a corresponding guide line 36 extends across the other refractive face 26 of each prism 22. The purpose of these guide lines 34 and 36 will become apparent from the following description which sets forth the manner in which the instrument of present invention is utilized.

Figure 4:
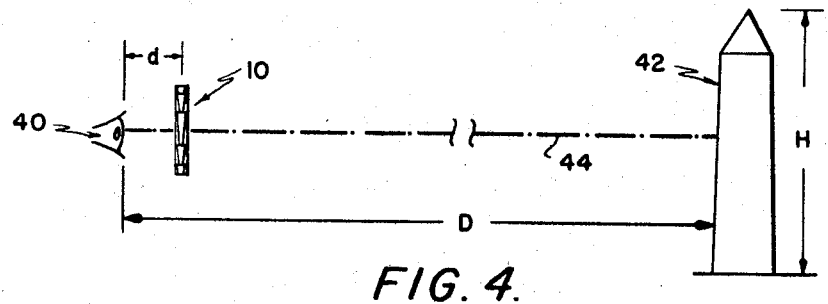
FIGURE 4 is a schematic view illustrating the manner in which the instrument is positioned when in use.

If attention is now directed to FIGURE 4, there is diagrammatically shown an observer's eye generally designated 40 and an object generally designated 42 spaced away from the observer's eye by an unknown distance D. The line of sight between the observer's eye 40 and the object 42 is designated 44. By using the instrument 10 of the present invention, the observer can calculate the distance D just so long as he knows one of the dimensions of the object 42 perpendicular to his line of sight 44. That is, the observer must either know the height of the object 42 or the width thereof. In the example of FIGURE 4, let it be assumed that the height of the object, designated H, is the quantity which is known to the observer.

To now use the instrument 10, the observer places a prism perpendicularly to his line of sight 44 and interposed between his eye 40 and the distant object 42. To properly position the instrument 10, the observer picks at random any prism 22 and positions the edge surface 20 thereof so that the same visually intersects the image of the object 42. For the prism to work properly, the same must be perpendicular to the observer's line of sight 44, and the guide lines 34 and 36 serve to establish such perpendicularity. That is, the observer must position the prism so that the guide lines 34 and 36 are coincident with one another, while the observer is viewing the object along his line of sight. When these guide lines move into proper coincidence with one another, the prism is at that time perpendicular to the line of sight 44, and the edge surface 20 thereof is visually intersecting the object.

Figure 5:
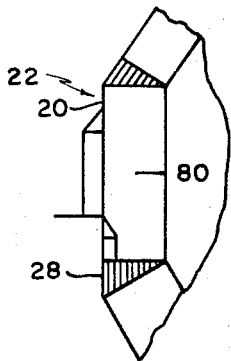
FIGURE 5 is a fragmentary elevational view of the instrument of the present invention, as in use.

With the prism 22 thus positioned perpendicularly in his line of sight, the observer can then view the image of the object 42 as refracted through a prism, and can similarly view the same directly. The observer then continues to make test sightings through each succesive prism 22 until he finds that prism which most closely aligns the top of the refracted image with the bottom of the image as seen directly. Under an ideal situation, there could be perfect coincidence between the top of the refracted image and the bottom of the image as seen directly, as shown in FIGURE 5. In this figure, the particular prism having the multiplier number "80" has accomplished the desired coincidence between the top of the refracted image and the bottom of the image as seen directly. The observer then finds the distance D to the object 42 by the following formula:

$$D = \text{Prism multiplier number} \times H$$

In the example shown in FIGURE 5, the distance D would equal 80 H or in other words, if the object 42 had a height H of 100 feet, the distance D would then be 80 x 100 feet or 8000 feet.

Figure 6:
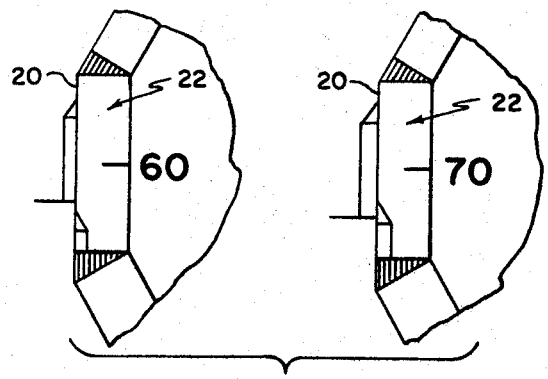
FIGURE 6 is a composite fragmentary elevational view of the instrument of the present invention, as in use under conditions different from those of FIGURE 5.

Under many conditions of operation, the observer will not find one particular prism which gives the exact coincidence desired, in the manner shown in FIGURE 5. In such an event, it is necessary to estimate a multiplier number, and an example of this type of operation will be described in connection with FIGURE 6. It will, of course, be appreciated that the distance D is different for FIGURE 6 than it was for FIGURE 5. In FIGURE 6, there is illustrated two test sightings through different prisms. When the observer looks through the prism with the number "60," the top of the refracted image falls somewhat short of coinciding with the bottom of the image as seen directly. However, when the observer then looks through the next higher prism, that is the one numbered "70," he finds that the top of the refracted image has extended somewhat past the point of coincidence with the bottom of the image as seen directly. In such event, the observer then knows that the correct multiplier is somewhere between "60" and "70," and he makes the proper estimation by considering the amount of underlap with the prism "60" and the amount of overlap with the prism "70." In the instance of FIGURE 6, it can be approximated that the correct multiplier would be about "66," and in such event, the distance D to the object 42, which as previously indicated has a height H of 100 feet, would be 66 x 100 or 6600 feet.

With all of the foregoing distance calculations, it was not material that the instrument 10 be properly spaced any particular distance from the observer's eye 40. In other words, the distance $d$ shown in FIGURE 4 was not critical in the previously described operation. However, in certain instances, it may be desired to use a selected multiplier of target height, and this can be accomplished by combining the principles of triangulation with those of prismatic refraction. In such event, the distance $d$ becomes important as will be described hereinafter in connection with FIGURE 7.

Figure 7:
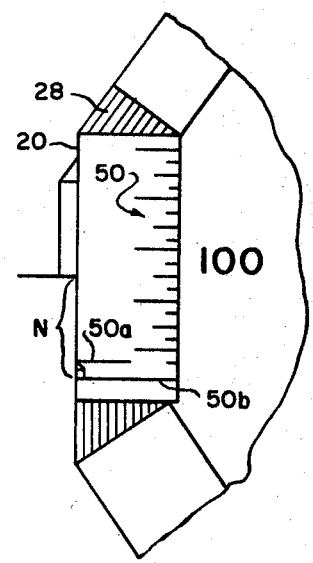
FIGURE 7 is a fragmentary elevational view of the instrument of the present invention used with a selected multiplier of target dimension.

In FIGURE 7, the prism "100" is provided with a series of closely spaced index lines, generally designated 50. The bottommost two lines are designated 50a and 50b, and in contrast to the remainder of the prism lines, these two lines extend from the outside edge 20 of the prism. In using the device in the manner shown in FIGURE 7, it is helpful if the observer can find a support to maintain the instrument in position, but this is not absolutely necessary. The observer varies the distance $d$ between his eye 40 and the instrument 10, as held perpendicularly to his line of sight 44, until the entire refracted image of the object 42 shows between the bottom guide lines 50a and 50b. When the image fully extends between these two guide lines, the observer then counts the number of index lines between the bottom guide line and the bottom of the image as seen directly. In FIGURE 7, this number is designated by the bracket N and amounts to eight spaces. The distance D from the observer to the target is then calculated by the following formula:

$$D = \text{Prism multiplier number} \times N \times H$$

Thus, in the instance of FIGURE 7, assuming that the height H of the object was still 100 feet, the distance D thereto would be equal to 100 x 8 x 100, or 80,000 feet.

As a practical matter, in forming the index lines 50 on the prisms, the spacing therebetween has been established as 0.05 inch. The rationale for the spacing has been arrived at in the following manner. Using the index for single target distance finding, in the normal manner described hereinabove, the instrument provides a distance to height ratio up to 200:1. Therefore, the provision for multiple target height ranging must start from this ratio. It must also be recognized that the average eye has difficulty in focussing on both a distant object and any measuring instrument which is held closer than 10 inches from the eye. When the instrument is held at a distance of 10 inches from the eye, a target having a distance to height ratio up 200:1 will subtend an arc of 0.05 inch on the plane of the prism. When such ratio is 500:1, the 0.05 inch index spacing lines will bracket the target or object at a distance from the eye of about 25 inches. If the ratio exceeds 500:1, the 0.05 inch spacing might still be used, but it would be somewhat difficult to see at a distance beyond 25 inches, and moreover, an extension would probably be needed since the average observer's arm cannot reach much further than 25 to 30 inches.

After reading the foregoing detailed description, it should be apparent that the objects set forth at the outset of this specification, have been successfully achieved by the present invention. Accordingly,

What is claimed is:

1. An instrument for measuring the distance from an observer to a distant object of known dimension perpendicular to the observer's line of sight, said instrument comprising:

disc means having opposed generally parallel planar first and second surfaces and an edge surface extending substantially perpendicularly therebetween;

said disc means being polygonal in shape and said edge surface hence being formed of a plurality of intercennected linear portions;

said disc means being fabricated of optically transparent material along at least the peripheral margin thereof;

at least said first surface including a plurality of discrete flat portions along the peripheral margin thereof, such flat portions being disposed at progressively succeeding angles to the plane of said first surface;

each of said flat portions and the corresponding aligned portions of said second surface serving to define an optical prism means;

each of said optical prism means deviating the image of said object in accordance with the angular disposition of said flat portions to thereby correlate the distance to the object with the known dimension thereof;

said instrument being positioned by the observer with a selected optical prism means interposed in his line of sight to the object and with the linear portion forming the edge of that optical prism means visually intersecting said object to thereby enable said observer to compare the difference between the image of said object as seen directly and the image of said object as refracted through said selected optical prism means;

said instrument including guide line means for each of said optical prism means, with the guide lines for any one optical prism means being visually aligned with one another when that optical prism means is disposed perpendicularly to the observer's line of sight to said object;

each of said optical prism means having a multiplying number associated therewith and marked on the disc means, which, when multiplied by said known dimension of said object indicates the distance between the observer and said object when said image as seen directly and said image as refracted through an optical prism means are aligned.

2. An instrument as defined in claim 1 wherein at least one of said optical prism means is provided with a plurality of equally spaced index lines being substantially perpendicular to said edge surface thereof.

References Cited

UNITED STATES PATENTS

| | | | |
|---|---|---|---|
| 1,088,701 | 3/1914 | Humbrecht | 88—2.4 |
| 1,257,765 | 2/1918 | Taylor et al. | 88—2.4 |
| 1,719,552 | 7/1929 | Karnes | 88—2.4 |
| 1,803,224 | 4/1931 | Waltman et al. | 88—2.7 |
| 2,262,100 | 11/1941 | French | 88—2.7 |
| 2,763,187 | 9/1956 | Wiener | 88—86 |

JEWELL H. PEDERSEN, *Primary Examiner.*

O. B. CHEW, *Assistant Examiner.*